United States Patent [19]

Voglaire

[11] Patent Number: 4,509,234
[45] Date of Patent: Apr. 9, 1985

[54] AUTO-REGENERABLE CAPACITOR AND METHOD OF MANUFACTURE THEREOF

[76] Inventor: Franz Voglaire, Rue Bois des Collines No. 15, Braine - l'Alleud, Belgium

[21] Appl. No.: 543,931

[22] Filed: Oct. 20, 1983

[30] Foreign Application Priority Data

Oct. 20, 1982 [EP] European Pat. Off. ........ 82870056.7
Feb. 4, 1983 [EP] European Pat. Off. ........ 83200184.6

[51] Int. Cl.³ .......................... H01G 7/00; H01G 4/24
[52] U.S. Cl. ..................................... 29/25.42; 361/273
[58] Field of Search ............... 361/273, 304, 309, 271, 361/272; 29/25.42

[56] References Cited

U.S. PATENT DOCUMENTS

| | | | |
|---|---|---|---|
| 2,814,091 | 11/1957 | Shen et al. | 361/304 X |
| 3,242,403 | 3/1966 | Fanning | 361/272 |
| 3,248,619 | 4/1966 | Ferrante | 361/273 |
| 4,150,419 | 4/1979 | Épple et al. | 361/275 |
| 4,161,774 | 7/1979 | Behn | 361/323 X |
| 4,170,812 | 10/1979 | Rayno | 29/25.42 |
| 4,240,127 | 12/1980 | Fanning et al. | 361/304 |

FOREIGN PATENT DOCUMENTS 793388 6/1973 Belgium .
1439334 3/1969 Fed. Rep. of Germany .
807475 1/1959 United Kingdom ..

Primary Examiner—Donald A. Griffin
Attorney, Agent, or Firm—Schwartz, Jeffery, Schwaab, Mack, Blumenthal & Koch

[57] ABSTRACT

A method of manufacturing an auto-regenerable capacitor, in which there is simultaneously wound a first tape (1) of dielectric material metallized on one of its sides except on one of the edges, and a second tape (2) of the same constitution as the first tape, arranged so that its non-metallized edge is opposite to the non-metallized edge of the first tape. A pair of packing tapes (7,8) is inserted between the ends of the first and second metallized wound tapes (1,2). The packing tapes (7,8) have approximately the same width as the first and second tapes (1,2) and are each covered by at least one metallic sheet (9,10) of a pre-determined length. A metal layer is deposited on either side of the wound edges of the first and second tapes (1,2) and also of the packing tapes (7,8).

11 Claims, 5 Drawing Figures

AUTO-REGENERABLE CAPACITOR AND METHOD OF MANUFACTURE THEREOF

BACKGROUND OF THE INVENTION

The present invention relates to an auto-regenerable capacitor and a method of manufacturing the capacitor.

There are already known auto-regenerable capacitors comprising a roll of tapes of dielectric material covered with metallic layers which are extremely thin and constitute electrodes. The automatic regeneration of such a capacitor, subsequent to a momentary, short short-circuit between opposite electrodes, is due to the evaporation of the metal of the electrodes at the point of fault or failure. The end of life of such a capacitor is marked by a short-circuit which renders the electrodes non-reparable. If the short-short circuit current is large it is able to fuse a fusible wire arranged in its circuit. In certain cases, a short-circuit can cause the explosion of the capacitor. The short-circuit current may also be low or lacking in strength at the point at which a fusible wire will not be fused. In this latter case, intense heating takes place in the vicinity of the piercing point and brings about the destruction of the capacitor.

An attempt has already been made to achieve protection against the ill-fated consequences of these defects, by enclosing the capacitor roll in a hermetic casing, deformable under the effect of an internal pressure. Since the destruction of a capacitor roll is generally accompanied by a release of gas, this phenomenon has already been utilized for bringing about the deformation of a portion of the casing to which is secured one end of a rupture wire permitting the capacitor to be removed from the circuit in the event of an increase of the internal pressure.

The mounting of such a rupture wire within the casing is a difficult process which considerably increases the overall cost of the capacitor.

SUMMARY OF THE INVENTION

It is an object of the invention to achieve the removal of the capacitor from a circuit by means of a much less expensive process, which process can be readily carried into effect during the manufacture of the capacitor.

It is already known to manufacture an auto-regenerable capacitor by means of a process of manufacture in which there are simultaneously rolled a first tape made from dielectric material, metallized on one of the sides except on one of the edges, and a second tape of the same constitution, arranged in such manner that its non-metallized edge is opposite to the non-metallized edge of the first tape, between the ends of the first and second metallized wound tapes one end of a non-metallized wrapping tape having approximately the same width as the said first and second tapes is inserted a metal deposit covers either side of the wound edges of the first and second tapes, as well as of the wrapping tape.

The invention makes it possible to conserve in principle this manufacturing technique and it necessitates solely a particular operation of the wrapping tape.

According to a first aspect of the present invention there is provided a method of manufacturing an auto-regenerable capacitor including the steps of: simultaneously winding a first tape made from dielectric material metallized on one of the sides thereof, except on one of the edges, and a second tape of the same constitution as the first tape, arranged in such manner that its non-metallized edge is opposite the non-metallized edge of the first tape; inserting between the ends of the first and second wound metallized tapes an end of a packing tape which is non-metallized and has approximately the same width as the first and second tape; and depositing a metal layer on either side of the wound edges of the first and second tapes as well as of the packing tape; characterized in that, said method additionally includes prior to the winding thereof, placing at least two metallic sheets on the packing tape, each sheet having a length of at least $\pi \times D$, each sheet being spaced apart from its neighbour by at least $\pi \times D$ and the first sheet being spaced apart from the longest of the two tapes by at least $\pi \times D$ where D is the diameter of the completed capacitor roll.

According to a second aspect of the present invention there is provided a method of manufacturing an auto-regenerable capacitor including the steps of: simultaneously winding a first tape made of dielectric material metallized on one of the sides thereof, except on one of the edges, and a second tape of the same constitution as the first tape, arranged in such manner that the non-metallized edge thereof is opposite to the non-metallized edge of the first tape; inserting between the ends of the first and second wound metallized tapes one end of a packing tape which is non-metallized and has approximately the same width as the first and second tape; and depositing a metal layer on either side of the wound edges of the first and second tapes as well as the packing tape; characterized in that said method includes providing a pair of packing tapes, each packing tape being covered by a metallic sheet on a predetermined length thereof, the metallic sheets being arranged in similar manner to the metallizations on the first and second tapes.

BRIEF DESCRIPTION OF THE DRAWINGS

The present invention will now be described in greater detail by way of example with reference to the accompanying drawings, wherein.

DETAILED DESCRIPTION OF THE PREFERRED EMBODIMENT

Figure 1:
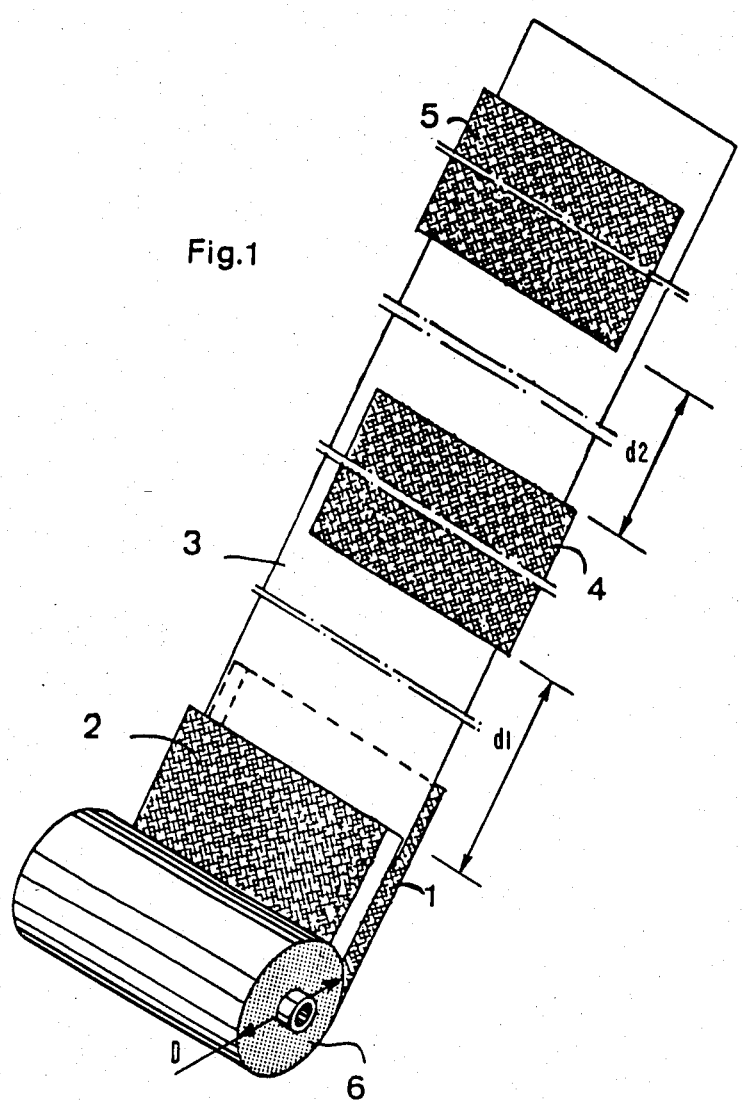
FIG. 1 is a perspective view of a capacitor made according to a first embodiment of a manufacturing process.

Referring to FIG. 1, a first tape 1 made from dielectric material, for example from polypropylene, is metallized on the upper side, except for on the left-hand edge. A second tape 2, made from the same dielectric material, is equally metallized on the upper side, except for on the right-hand edge. Between the free ends of the first and second tapes 1 and 2 there is inserted a packing or wrapping tape 3 also made from a dielectric material, again for example from polypropylene, although it is not essential for this wrapping tape 3 to be of the same dielectric material as that of the first and second tapes 1 and 2. It is even advantageous to choose a dielectric material for the wrapping or packing tape 3 which deteriorates more readily in the presence of at least one of the phenomena accompanying the destruction of the auto-regeneratable capacitor. On the same side of the packing or wrapping tape 3, there are arranged two aluminum sheets 4 and 5 and they are secured to the tape 3 by means of appropriate soldering or welding techniques. The sheets 4 and 5 each possess a length at least approximately equal to or greater than $\pi \times D$, D being the diameter of the completed capacitor roll 6, when the first and second tapes have been completely wound up to form the capacitor roll 6.

The distance d1 between the end of the second tape 2 which in use is the longest and the adjacent edge of the aluminium sheet 4 is greater than $\pi D$ and preferably greater than $2\pi D$.

Furthermore, the distance d2 between the adjacent edges of the sheets 4 and 5 is greater than $\pi D$ and preferably greater than $2\pi D$.

Figure 2:
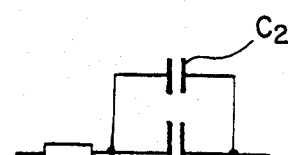
FIG. 2 is a circuit diagram of said capacitor.

After complete winding of the three tapes 1, 2 and 3, the two lateral ends of the capacitor roll 6 are covered by the deposition of a metal layer, for example zinc, according to the Schoop process. As a result, the electrical circuit of the capacitor roll 6 is that shown in FIG. 2. The circuit of the capacitor roll 6 comprises a main auto-regenerator condenser C1, connected in parallel with an auxiliary non-auto-regenerable capacitor C2.

A capacitor roll manufactured by this technique functions as follows: When a short-circuit is set up at any location of the auto-regenerable capacitor C1 and when regeneration does not take place, the destruction in the vicinity of the defect is propagated by degrees relative to the adjacent coatings, and relatively quickly reaches the coatings between the metallic sheets 4 and 5 of the auxiliary capacitor C2. At this instant, a heavy short-circuit current is established between the sheets 4 and 5, the magnitude of which is sufficiently high to destroy a fuse or trip a circuit-breaker of the installation of which the capacitor is a part. It is evident that if the original short-circuit takes place in the auxiliary capacitor C2, a heavy short-circuit current will occur from the start. However, when selecting the thickness of the insulator between the sheets 4 and 5, or when taking into account the normal service temperatures, it is preferable to select a better quality of dielectric material for the insulating tape between the sheets 4 and 5 than for the insulating tape between the metallizations of the tapes 1 and 2, so that there is less probability that the auxiliary condensor C2 will produce a short-circuit in the absence of a short-circuit which is non-reparable in the main condenser C1.

There is of course no need to limit the number of metallic sheets which make up the auxiliary capacitor C2.

Figure 3:
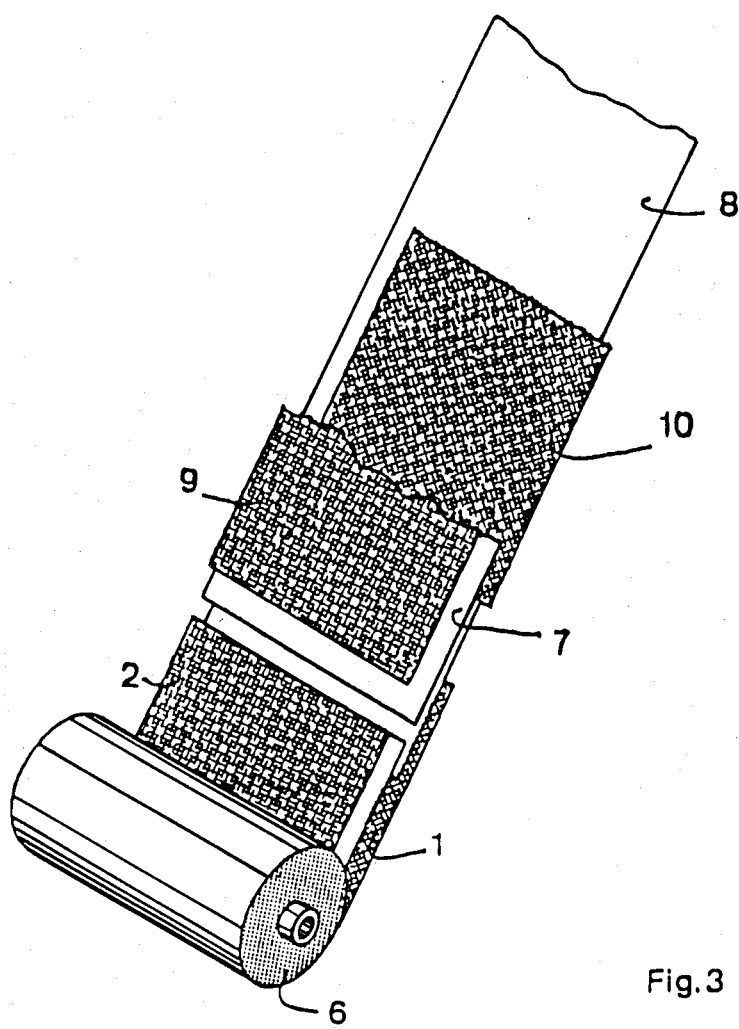
FIG. 3 is a perspective view of a capacitor made according to a second embodiment of a manufacturing process.

Referring now the second embodiment of the manufacturing process of a capacitor shown in FIG. 3, it will be seen that it is also possible to provide two packing or wrapping tapes 7 and 8, each covered by respective metallic sheets 9 and 10. In this case, the metallic sheets 9 and 10 are arranged in relation to the tapes 7 and 8 in the same manner as the metallizations of the tapes 1 and 2, but it is not necessary to securely fix a metallic sheet with each of the tapes. In some circumstances it may be more advantageous to secure the metallic sheets with only one of the wrapping tapes, for example the tape 7, in which case the other tape 8 is a simple tape made from a dielectric material. The metallic sheets 9 and 10 are provided over a pre-determined length of the respective packing tapes 1 and 2.

The capacitors obtained by means of the manufacturing processes described above are found, as are normal capacitors, to be extremely simple objects. In fact, although they comprise an auto-regenerable capacitor surrounded by a non-auto-regenerable capacitor, both being arranged in parallel, this arrangement in parallel requires no particular organization or arrangement. On the contrary, it is effected automatically, during the covering by metal deposition on the two lateral faces of the capacitor roll.

However, under certain conditions of utilization, it is possible that low current short-circuits are produced relatively near to a lateral end of the capacitor roll near the surface covered by metal deposition, and that these low current short circuits are not detected in a sufficiently short delay, by the heavy current short-circuit of the auxiliary capacitor surrounding the auto-regenerable capacitor.

Such a danger may be very readily avoided, due to the fact that during the manufacture of the auto-regenerable capacitor, there are applied on the insulating tapes metal layers the average thickness of which diminishes on either side of the localized tape at a distance determined by the edges of the tape.

Figure 4:
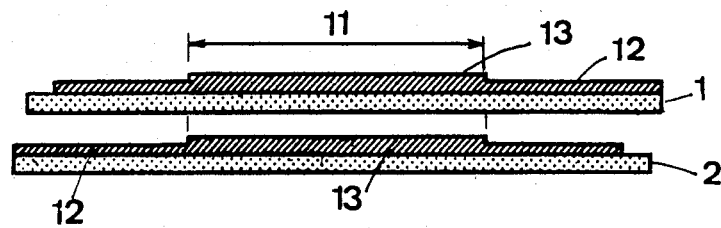
FIGS. 4 and 5 are diagrammatic sections of pairs of different ribbons used in the manufacturing techniques.
Figure 5:
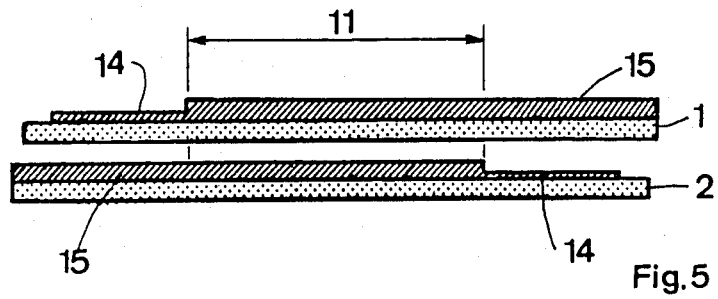

FIGS. 4 and 5 show two diagrammatic sections of pairs of different tapes forming auto-regenerable capacitor rolls. A capacitor roll 6 is formed by a wrapping of a pair of metallized, insulating tapes 1 and 2. The metallization of these tapes 1 and 2 is uniform, but exhibits an average thickness, substantially smaller on either side of a band 11, the median line of which is wound in a plane perpendicular to the axis of the roll, for example, the plane of symmetry perpendicular to the axis of the capacitor roll. Referring to FIG. 4, a metallized layer 13 of each tape 1 and 2 exhibits a flange 12 at the edges of the band 11. However, this arrangement is not unique, since it suffices, in order to achieve the desired effect, that the mean thickness of the assembly of layers on the two tapes 3 and 4 should exhibit a reduction externally of the band 11. This result may be obtained also, for example, by a metallization as shown in FIG. 5, i.e. by metallized layers which have at one side of the band 11 a small thickness 14 and, at the location of the band 11 itself and on the other side, a large thickness 15. The large thickness, which is preferably located at the side at which the metallization extends as far as the insulating tape edge on which a contact electrode is applied, for example by the Schoop process. The contact electrode is preferably made of zinc. In the vicinity of the edge, a supplementary enforcement (not shown) can be provided for the purpose of improving the contact between the zinc layer and the capacitor electrode.

It is self-evident that the band 11 is not necessarily required to be symmetrical relative to the roller and to be wound at the location of the plane of symmetry of the roller, perpendicular to the axis of the latter. In an alternative form the band 11 can be wound at a location which is displaced relative to the plane of symmetry.

It is obviously possible to reduce the lateral extent of the auxiliary capacitor and to limit it with respect to the proximity of the locations at which is wound the band 11 of standard metallization where the deteriorations take place, but such a reduction is justified only where the dielectric materials used for the auxiliary capacitor are costly since the advantage of providing a parallel arrangement of the two capacitors, by means of a single metal deposition on the lateral ends of the complete capacitor roll, is then lost.

On the contrary, when the auxiliary capacitor has a width equal to that of the auto-regenerable capacitor, it is possible to reduce the surfaces of the electrode portions of diminished mean thickness, which is the same as enlarging the band 11 of normal thickness. The width of the band 11 may be selected to be lower than of approximately equal to the width of the auto-regenerable capacitor less the diameter of the complete wound roll.

It is self-evident that the limits between metallization of small thickness and metallization of normal thickness must not necessarily be sudden thickness variations but preferably extend in a progressive manner over a predetermined width.

What is claimed is:

1. A method of manufacturing an auto-regenerable capacitor, comprising the steps of:
   providing a first tape made from dielectric material metallized on one side except for one edge;
   providing a second tape, said second tape being similar to said first tape and being made from dielectric material metallized on one side except for one edge;
   provided a non-metallized packing tape having at least two metal sheets thereon, each metal sheet having a length of at least $\pi \times D$ and each metal sheet being spaced apart from the next adjacent metal sheet by at least $\pi \times D$;
   arranging said first and second tapes and said packing tape such that said non-metallized edges of said first and second tapes are positioned opposite each other, and said metal sheets are positioned such that the closest of said metal sheets to said first and second tapes is spaced from the longest of said first and second tapes by at least $\pi \times D$;
   winding said first and second tapes and said packing tape to form a capacitor roll; and
   depositing a metallized layer on the edges of said wound first and second tapes as well as the edges of said packing tape to form contacts for said capacitor roll;
   wherein D is the diameter of said capacitor roll.

2. The method according to claim 1 wherein the distance between adjacent metallic sheets is in the range between $\pi \times D$ and $2\pi \times D$.

3. The method according to claim 1 wherein the distance between the longest of said first and second tapes and the closest of said metal sheets is in the range between $\pi \times D$ and $2\pi \times D$.

4. The method according to claim 1 wherein said packing tape has a width approximately equal to the width of said first and second tapes.

5. The method according to claim 1 wherein said metal sheets are secured to the same side of said packing tape.

6. The method according to claim 1 wherein an edge of one of said metal sheets is aligned with one metallized edge of one of said first and second tapes, and an edge of the other metal sheet is aligned with the metallized edge of the other of said first and second tapes.

7. The method according to claim 1 wherein said metallized first and second tapes are formed with metallized layers having a combined average thickness which diminishes on either side of a band of normal average thickness.

8. The method according to claim 7 wherein said band of normal average thickness is no wider than the width of said first and second tapes less the diameter of said roll.

9. The method according to claim 1 wherein the material of said packing tape is different than the material of said first and second tapes.

10. A method of manufacturing an auto-regenerable capacitor, comprising the steps of:
   providing a first tape made from dielectric material metallized on one side except for one edge;
   providing a second tape, said second tape being similar to said first tape and being made from dielectric material metallized on one side except for one edge, wherein said metallized first and second tapes are formed with metallized layers having a combined average thickness which diminishes on either side of a band of normal average thickness;
   providing a first packing tape and a first metallic sheet arranged to cover a predetermined length of said first packing tape except for one edge of said first packing tape;
   providing a second packing tape and a second metallic sheet arranged to cover a predetermined length of said second packing tape except for one edge of said second packing tape;
   arranging said first and second tapes and said first and second packing tapes such that the non-metallized edges of said first and second tapes are opposite each other and said one edge of said first and second packing tapes free of said first and second metallic sheets are opposite each other;
   winding said first and second tapes together with said first and second packing tapes to form a capacitor roll; and
   depositing a metal layer on each side of the edges of the wound tapes to form capacitor contacts.

11. A method according to claim 10 wherein said band of normal average thickness has a width no greater than the width of said first and second tapes less the diameter of the capacitor roll.

* * * * *